A. KINGSBURY.
THRUST BEARING.
APPLICATION FILED JAN. 17, 1913.

1,117,504. Patented Nov. 17, 1914.

WITNESSES
E. W. Marshall
G. L. Blume

INVENTOR
Albert Kingsbury
BY
ATTORNEY

UNITED STATES PATENT OFFICE.

ALBERT KINGSBURY, OF PITTSBURGH, PENNSYLVANIA.

THRUST-BEARING.

1,117,504.  Specification of Letters Patent.  Patented Nov. 17, 1914.

Application filed January 17, 1913. Serial No. 742,580.

*To all whom it may concern:*

Be it known that I, ALBERT KINGSBURY, a citizen of the United States, and a resident of Pittsburgh, in the county of Allegheny and State of Pennsylvania, have invented a new and useful Improvement in Thrust-Bearings, of which the following is a specification, reference being had to the accompanying drawings, forming a part thereof.
My invention relates to thrust bearings and particularly to such as comprise a plurality of tiltingly supported bearing shoes.

The object of my invention is to provide means for establishing a film of lubricating fluid on the contact surfaces of the several shoes of a bearing of this kind preliminary to starting the rotation of the movable member of the device, the structure and arrangement of the parts of the bearing being such as to automatically maintain such a film when the device is operating.

Other objects will hereinafter be set forth.

I will describe my invention in the following specification and point out the novel features thereof in appended claims.

Figure 1:
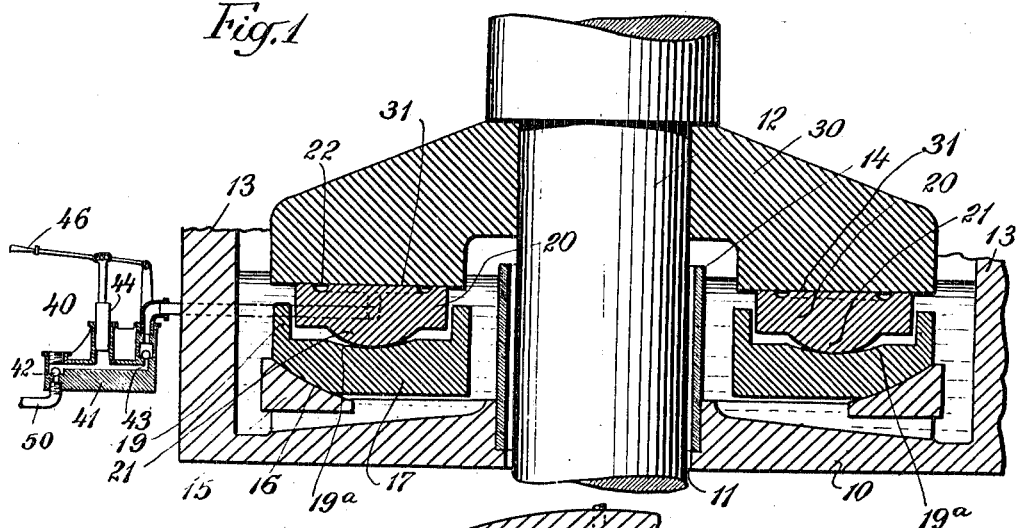
Figure 2:
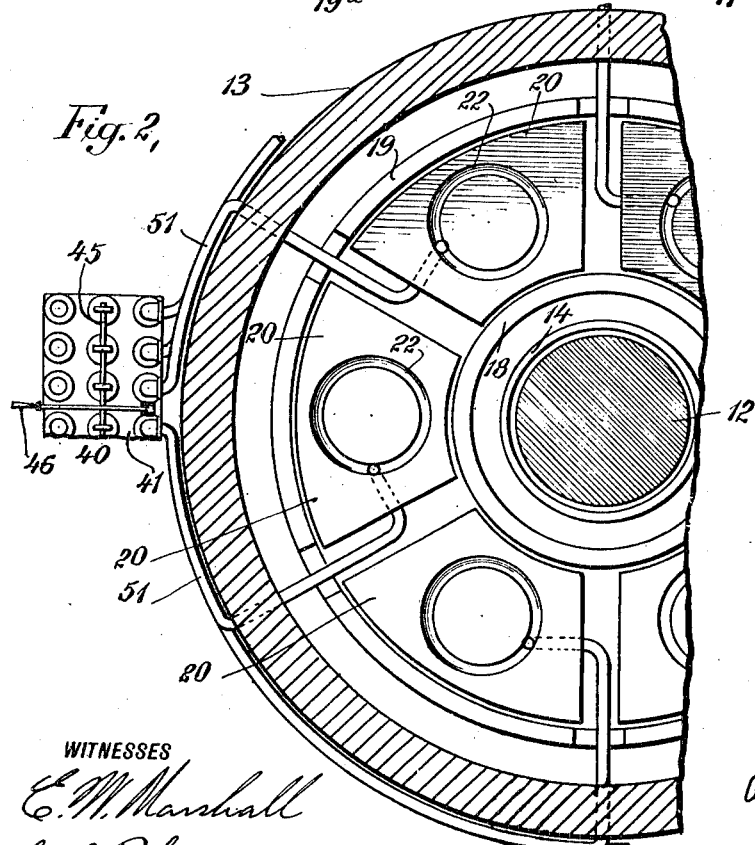

Referring to the drawings,—Figure 1 is a central sectional elevation, of a thrust bearing constructed and equipped in accordance with my invention. Fig. 2 is a plan view of a portion of the bearing of Fig. 1 with certain of the parts broken away to avoid unnecessary duplication.

Like characters of reference designate corresponding parts in all the figures.

In Patent No. 947,242, granted January 25, 1910, on an application filed by me on May 20, 1907, I have shown and described a thrust bearing which operates successfully at relatively high speeds and under very high pressures. When a bearing of this character is at rest, the bearing surfaces of the shoes are in engagement with the surface of the coöperating bearing member, but when the bearing is in service and one of the parts is rotating, the shoes assume a slightly tilted position, by reason of the wedging action of the oil or other lubricating fluid in which the bearing surfaces are immersed. In order to allow the shoes to assume this position, they are tiltingly supported. It is therefore evident that although the friction between the bearing surfaces is very low when the device is in operation, the friction may be high at starting. This starting friction may be disadvantageous when the bearing is used in connection with vertical rotary converters, synchronous motors and other dynamo-electric machines having a relatively low starting torque, and is eliminated by my present invention.

10 is a stationary base or support having a central opening 11 through which a shaft 12 extends and walls or flanges 13 and 14. The flange 14 is in the form of a sleeve and loosely surounds the shaft 12. Between the flanges is an annular pocket or well containing oil in which the bearing parts operate.

An annular projection 15 is formed in or secured to the base and has a spherically curved surface 16 on which an annular channel-shaped member 17 is mounted. This member has a guide flange 18 at its inner edge and an interrupted guide flange 19 at its outer edge. Its bottom surface is preferably provided either with spherically curved depressions 19ª of relatively long radius or radially arranged cylindrically curved grooves. A series of bearing shoes 20 which are shaped like similar ring segments are loosely fitted into the channel-shaped member 17 and are prevented from rotating or being radially displaced by the flanges 18 and 19. Each shoe has a spherically curved projection 21 which is supported on the bottom channel surface of the member 17 and is seated in one of the depressions 19ª. A collar 30 is provided on the shaft 12 and has a bottom surface 31 which rests upon the top surfaces of the shoes. In the top bearing surface of each shoe is a circular groove or slot 22.

A pump 40 having a plurality of similar sections is adapted to supply oil under pressure to the grooves 22 in the several shoes. Each section of the pump comprises a body 41, having an inlet valve 42 and an outlet valve 43, and a plunger 44 operating in a cylindrical opening in the body between the valves. The plungers of the several pump sections are joined by a connecting rod 45 so that they operate in synchronism when a single pump lever 46 is actuated.

All of the pump sections may have a common body member in which the several plungers operate and any suitable means such as a motor may be used to drive the pump but as it is only actuated at starting, a motor will usually be unnecessary.

Oil is supplied through pipes 50 from any suitable source (not shown) to the inlet ports of the pump and oil may be forced under pressure into the annular grooves 22 of the shoes through the inlet valves 43 and a plurality of pipe sections 51. These pipe sections are sealed into the wall 13 of the base 10 in order to make oil tight joints since they enter below the level of the oil therein. They are relatively small in diameter and preferably extend from the wall 13 between adjacent pairs of shoes to the center of the annular channel, in which the shoes are located, thence each of them is led into one end of a shoe. Each shoe is suitably drilled or cored to establish a communication to its annular groove 22.

When it is desired to start rotating the shaft 12 and whatever may be mounted on it, the pump lever 46 is first actuated and oil is forced under pressure to the grooves 22. This oil without appreciably lifting the shaft and its connections, is squeezed out between the bearing surface of the shoes 20 and the collar 30 thereby establishing an oil film which reduces the starting friction to a small fraction of what it would be otherwise. As soon as the shaft and the attached collar are rotating the oil which is contained in the base 10 and in which the shoes are immersed is wedged between the bearing surfaces automatically as explained in my Patent No. 947,242 to which reference has been made.

The pump 40 will usually be a small relatively inexpensive device and a few impulses when starting the device will fully accomplish the intended function.

A single pump with several branch outlet pipes may be used instead of the plural pump described but I prefer to use separate valves and plungers in order to insure the establishment of a film under every shoe even if the shoes are unequally loaded.

The tilting movement of the shoes is so slight and the weight which they are adapted to carry is so great that ordinary metal pipes may be used for connecting the pumps to the shoes without interfering with the operation of the bearing.

What I claim is:—

1. A thrust bearing comprising a relatively rotatable member having a bearing surface and a plurality of relatively stationary, tiltingly supported shoes having bearing surfaces adapted to engage the surface of the rotatable member and a recess in the bearing surface of each shoe, said recesses being adapted to receive oil under pressure to establish an oil film between the bearing surfaces when the parts are at rest, said shoes being adapted to automatically maintain an oil film between the bearing surfaces when the rotatable member is in motion.

2. A thrust bearing comprising a relatively rotatable member having a plane bearing surface and a plurality of relatively stationary, tiltingly supported shoes adapted to engage said bearing surface and arranged to automatically establish an oil film between the engaging surfaces when the rotatable member is in motion, said shoes being provided with annular recesses in their bearing surfaces, adapted to receive oil under pressure whereby an oil film may be established between the engaging surfaces for starting.

3. A thrust bearing comprising a relatively rotatable member having a plane bearing surface, an annular channel-shaped supporting member containing oil and a plurality of relatively stationary bearing shoes tiltingly supported within said channel-shaped base and having bearing surfaces adapted to coöperate with the bearing surface of the rotatable member, each of said shoes having an annular recess in its bearing surface and being arranged to automatically establish an oil film between the engaging surfaces of the bearing when the rotatable member is in motion, and a plurality of supply pipes extending outside the base and communicating with the annular recesses through which oil may be independently supplied under pressure to the several annular recesses to provide an oil film between the bearing surfaces in starting.

In witness whereof, I have hereunto set my hand this 13th day of January in the year 1913.

ALBERT KINGSBURY.

Witnesses:
EMIL MATTMAN,
B. B. HINES.